US012434467B2

(12) United States Patent
Chai et al.

(10) Patent No.: US 12,434,467 B2
(45) Date of Patent: Oct. 7, 2025

(54) METHOD AND APPARATUS FOR SUBSTRATE AND SPACER SEPARATION

(71) Applicant: Western Digital Technologies, Inc., San Jose, CA (US)

(72) Inventors: Kok Kiong Chai, Sarawak (MY); Siew Fu Chai, Sarawak (MY); Samg Yin Tang, Sarawak (MY)

(73) Assignee: Western Digital Technologies, Inc., San Jose, CA (US)

( * ) Notice: Subject to any disclaimer, the term of this patent is extended or adjusted under 35 U.S.C. 154(b) by 175 days.

(21) Appl. No.: 18/228,080

(22) Filed: Jul. 31, 2023

(65) Prior Publication Data
US 2025/0001752 A1      Jan. 2, 2025

Related U.S. Application Data

(60) Provisional application No. 63/523,801, filed on Jun. 28, 2023.

(51) Int. Cl.
*B32B 43/00*     (2006.01)
*B32B 38/18*     (2006.01)

(52) U.S. Cl.
CPC .... *B32B 43/006* (2013.01); *B32B 2038/1891* (2013.01); *B32B 2309/66* (2013.01); *B32B 2429/02* (2013.01); *Y10T 156/1174* (2015.01); *Y10T 156/1189* (2015.01); *Y10T 156/195* (2015.01); *Y10T 156/1972* (2015.01)

(58) Field of Classification Search
CPC ............. B32B 43/006; Y10T 156/1174; Y10T 156/1189; Y10T 156/195; Y10T 156/1972
See application file for complete search history.

(56) References Cited

U.S. PATENT DOCUMENTS

| 6,066,229 A | * | 5/2000 | Komine | .................. B32B 43/00 134/1 |
| 8,932,431 B2 | * | 1/2015 | Coto | ...................... H02K 15/02 29/407.07 |
| 2003/0205060 A1 | | 11/2003 | Iwabuchi et al. | |

(Continued)

FOREIGN PATENT DOCUMENTS

| JP | 2009048735 A | 3/2009 |
| JP | 2013134793 A | 7/2013 |
| WO | 2006019170 A1 | 2/2006 |

*Primary Examiner* — Philip C Tucker
*Assistant Examiner* — Nickolas R Harm
(74) *Attorney, Agent, or Firm* — LOZA & LOZA, LLP; Gabriel Fitch (57) ABSTRACT

Automatic separation of substrates from spacers within a substrate/spacer stack or laminate for use during a hard disk recording media fabrication process. In one example, a delamination apparatus includes a roller or brush configured to rotate while pressing against a flat surface of a substrate at one end of the laminate to peel the substrate from the laminate to expose an adjacent spacer and to then rotate against a flat surface of the spacer to peel the spacer from the laminate to expose another substrate of the laminate. The apparatus also includes a pusher bar configured to push against the opposite end of the laminate to push the laminate against the roller. The pusher bar may be offset from a central longitudinal axis of the laminate. A bath may be provided for submerging the laminate, the pusher, and the roller in a lubricating liquid. Method embodiments are also described.

20 Claims, 8 Drawing Sheets

(56) References Cited

U.S. PATENT DOCUMENTS

| 2007/0002264 | A1 | 1/2007 | Kim |
| 2011/0053466 | A1 | 3/2011 | Hoshino et al. |
| 2011/0123834 | A1 | 5/2011 | Hoshino et al. |
| 2021/0005220 | A1 | 1/2021 | Takano |

* cited by examiner

PLAN VIEW

FIG. 9

PROFILE VIEW

FIG. 10

METHOD AND APPARATUS FOR SUBSTRATE AND SPACER SEPARATION

CROSS-REFERENCE TO RELATED APPLICATIONS

This application claims priority to and the benefit of U.S. Provisional Patent Application No. 63/523,801, filed on Jun. 28, 2023 entitled, "METHOD AND APPARATUS FOR SUBSTRATE AND SPACER SEPARATION," the entire content of which is incorporated herein by reference.

FIELD

The subject matter described herein relates to substrates for use in hard disk recording media. More particularly, the subject matter relates, in some examples, to methods and apparatus for automatically separating substrates from spacers within a substrate/spacer stack or laminate during a hard disk recording media fabrication process.

INTRODUCTION

Hard disk drives (HDD) are data storage devices used for magnetically storing and retrieving digital information using rapidly rotating disks. Each disk includes a substrate such as a glass substrate. During the overall fabrication procedure of the disks, edge polishing is performed in which a cylindrical stack or laminate of dozens of substrates separated by spacers are processed to polish outer diameter (OD) and/or inner diameter (ID) edges of the substrates. Following edge polishing, the substrates of the stack should be separated from the spacers of the stack so that the substrates can be further processed. Conventionally, the separation is a manual procedure in which a technician removes one substrate or spacer at a time by hand from an end of the cylindrical stack to separate the substrates from the spacers. The technician places the substrates in one set of trays and the spacers in another set of trays. This is an inefficient and costly procedure. Herein, an apparatus and a procedure are provided for automatically separating the substrates from the spacers and for providing other features or advantages.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides an apparatus for separating components of a laminate of disk-shaped substrates interleaved with disk-shaped spacers. The apparatus includes: a pusher bar configured to push against a first end of the laminate to push a second end of the laminate against a roller; wherein the roller is configured to rotate while pressing against a flat surface of a substrate at the second end of the laminate to remove the substrate from the second end of the laminate to expose a spacer of the laminate and to then rotate while pressing against a flat surface of the spacer to remove the spacer from the laminate to expose another substrate of the laminate; and a controller configured to control the roller and the pusher bar to sequentially remove the substrate, the spacer, and additional substrates and spacers from the laminate.

Another aspect of the disclosure provides an apparatus that includes: a bath configured to submerge a laminate of disk-shaped substrates interleaved with disk-shaped spacers; a pusher bar configured to push against a first end of the laminate to push a second end of the laminate against a roller; wherein the roller is configured to rotate while pressing against a flat surface of a substrate at the second end of the laminate to remove the substrate from the second end of the laminate to expose a spacer of the laminate and to then rotate while pressing against a flat surface of the spacer to remove the spacer from the laminate to expose another substrate of the laminate; and a controller configured to control the roller and the pusher bar to sequentially remove the substrate, the spacer, and additional substrates and spacers from the laminate.

Yet another aspect of the disclosure provides a method for separating components of a laminate of disk-shaped substrates and disk-shaped spacers. The method includes: pressing a pusher arm against a first end of the laminate to push a second end of the laminate against a roller; rotating the roller against a flat surface of a substrate at the second end of the laminate to remove the substrate from the second end of the laminate to expose a spacer of the laminate; and rotating the roller against a flat surface of the spacer to remove the spacer from the second end of the laminate to expose another substrate of the laminate.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

As noted above, during the fabrication of disks for use in a hard disk drive (HDD), edge polishing may be performed in which a cylindrical stack or laminate of disk-shaped substrates separated by spacers are processed to polish outer diameter (OD) edges and/or inner diameter (ID) edges of the substrates. Following edge polishing stages, the substrates of the stack should be separated from the spacers of the stack so that the substrates can be further processed. Conventionally, the separation is a manual procedure in which a technician removes one substrate or spacer at a time by hand from an end of the cylindrical stack to separate the substrates from the spacers. The technician places the substrates in one set of trays and the spacers in another set of trays. This is an inefficient and costly procedure.

Herein, apparatus and procedures are provided for automatically separating the substrates from the spacers and for providing other functions, features, or advantages.

In one aspect, an apparatus for separating the components of a laminate of disk-shaped substrates interleaved with disk-shaped spacers is provided that includes: a pusher bar configured to push against a first end of the laminate to push a second end of the laminate against a roller or brush. The roller or brush is configured to rotate while pressing against a flat surface of a substrate at the second end of the laminate to remove (e.g., peel) the substrate from the second end of the laminate to expose an adjacent spacer of the laminate and then to rotate while pressing against a flat surface of the spacer to remove the spacer from the laminate to expose another substrate of the laminate. The apparatus also includes a controller configured to control the roller and the pusher bar to sequentially remove the substrate, the spacer, and additional substrates and spacers from the laminate. The apparatus may also include a bath for submerging the laminate as well as the pusher and roller within a lubricating liquid. The pusher bar may be offset from a central longitudinal axis of the laminate to apply pressure to the laminate at a position offset in the same direction that the roller peels the substrate and spacer from the laminate. For example, if the roller is configured to peel the substrates and spacers vertically from the laminate and out of the liquid bath, the pusher bar is offset in the vertical direction.

In some aspects, the roller is a first roller and the apparatus further includes a second roller and a third roller that are positioned and configured to sequentially receive substrates and spacers peeled from the laminate by the first roller and to convey the substrates and spacers farther from the first end of the laminate (e.g., vertically out of the liquid bath). A robot picker arm (e.g., a "pick and place" device) may be provided that is configured to transport each substrate that has been peeled away from the laminate to a substrate-retaining tray and to transport each spacer that has been peeled from the laminate to a spacer-retaining tray. To avoid scratching the substrates, the robot picker arm may have an ethylene propylene diene monomer (EPDM) layer or coating on its pincher mechanism. A computer controller controls the operation of the roller, the pusher bar, and the robot picker arm to operate until each substrate of the laminate has been separated from the laminate and placed in the substrate-retaining tray and each spacer of the laminate has been separated from the laminate and placed in the spacer-retaining tray. A sensor may be provided to verify that, at any given time, the picker arm holds the expected component, either a substrate or a spacer, so that substrates are not placed in the spacer-retaining tray and spacers are not placed in the substrate-retaining tray. The substrates may be, for example, glass substrates with an OD and an ID and the spacers may be, for example, polypropylene (PP) spacers. In some examples, green translucent spacers are used during an ID edge polishing stage and orange translucent spacers are used during an OD edge polishing stage. Accordingly, the sensor of the apparatus is configured to sense or detect either green or orange spacers and distinguish those colored spacers from the transparent substrates.

In another aspect, an apparatus for separating the components of a laminate of disk-shaped substrates and disk-shaped spacers is provided that includes: a bath configured to submerge a laminate of disk-shaped substrates interleaved with disk-shaped spacers and a pusher bar configured to push against a first end of the laminate to push a second end of the laminate against a roller or brush. The roller or brush is configured to rotate while pressing against a flat surface of a substrate at the second end of the submerged laminate to remove (e.g., peel) the substrate from the second end of the laminate to expose a spacer of the submerged laminate and to then rotate while pressing against a flat surface of the spacer to remove the spacer from the submerged laminate to expose another substrate of the laminate. A controller is configured to control the roller and the pusher bar to sequentially remove the substrate, the spacer, and additional substrates and spacers from the laminate.

In another aspect, a method is provided for separating components of a laminate of disk-shaped substrates and disk-shaped spacers, the method includes: pressing a pusher arm against a first end of the laminate to push a second end of the laminate against a roller or brush; rotating the roller or brush against a flat surface of a substrate at the second end of the laminate to remove (e.g., peel) the substrate from the second end of the laminate to expose a spacer of the laminate; and rotating the roller or brush against a flat surface of the spacer to remove the spacer away the laminate to expose another substrate of the laminate.

Figure 1:
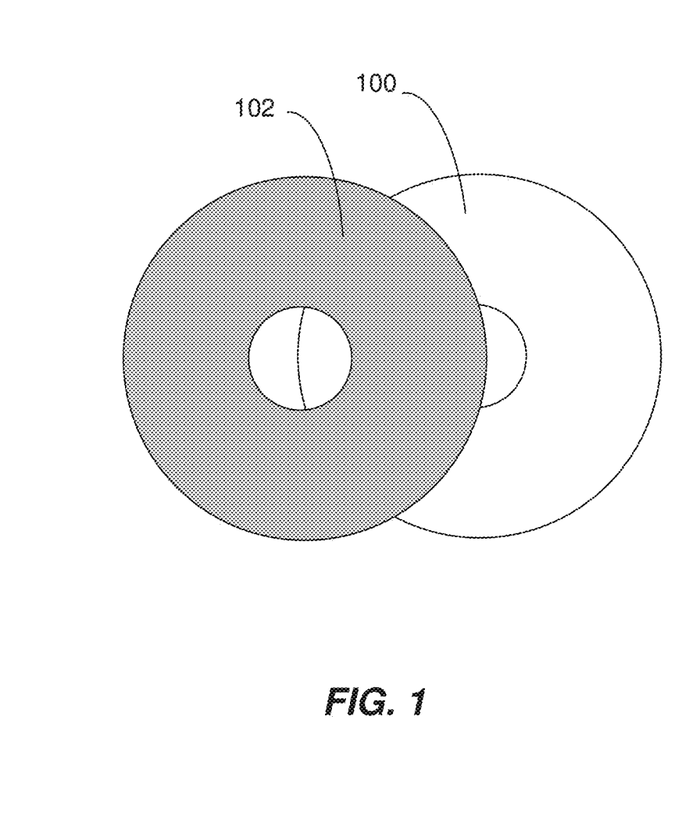
FIG. 1 illustrates a top view of a clear glass substrate and a translucent spacer, configured in accordance with an aspect of the disclosure.
Figure 2:
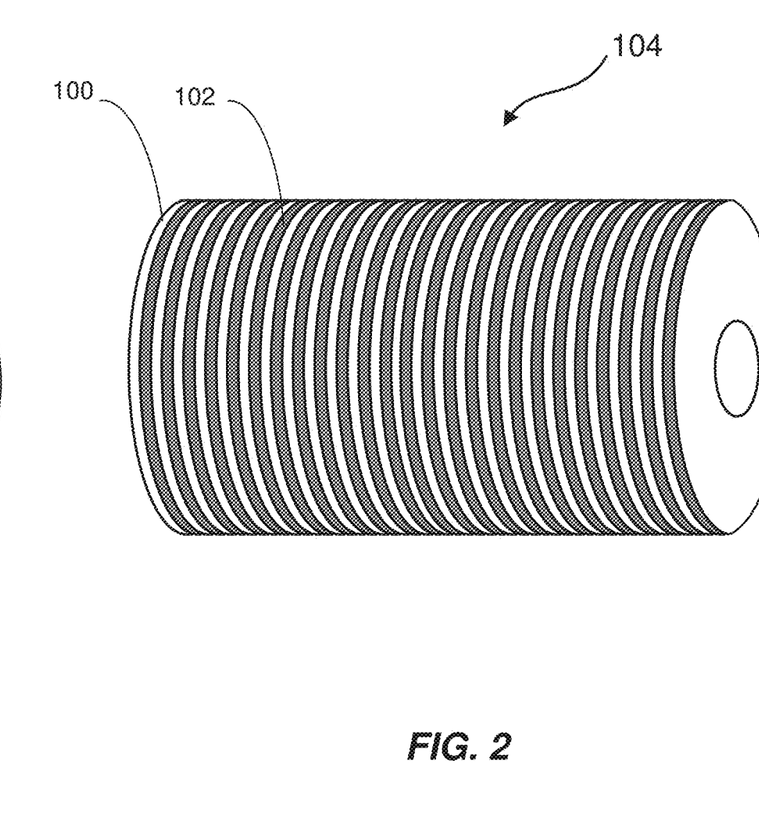
FIG. 2 illustrates a perspective view of a stack or laminate of the substrates and spacers of FIG. 1, configured in accordance with an aspect of the disclosure.
Figure 3:
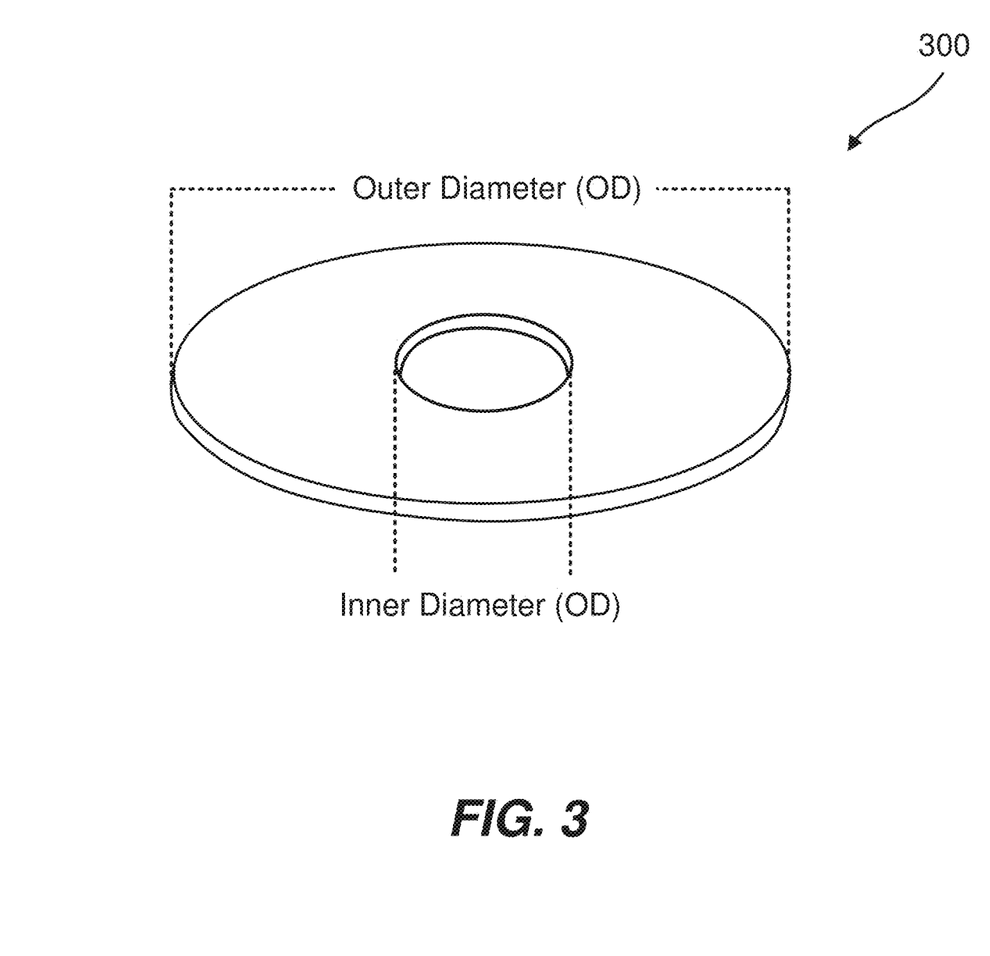
FIG. 3 illustrates a perspective view of a glass substrate following separation from a laminate and particularly illustrating its inner and outer diameters, in accordance with an aspect of the disclosure.

FIG. 1 illustrates a transparent glass substrate 100 and a translucent poly-propylene (PP) spacer 102. The spacer may be, for example, orange or green. The glass substrate 100 is sized and configured for use as the substrate of an HDD media disk. Prior to the deposition of various media recording layers and other layers onto the substrate, the ID and OD edges of the substrate 100 are polished during one or more polishing stages. To facilitate edge polishing, the substrates 100 and spacers 102 are stacked together, as shown in FIG. 2 to form a laminate or disk-shaped stack 104. Following a particular polishing stage, which might be an ID edge polishing stage or an OD edge polishing stage, the substrates need to be separated from the spacers for further processing. FIG. 3 illustrates just a substrate 300 showing its ID and its OD.

As noted above, in some substrate disk fabrication procedures, two polishing stages are provided: an OD edge polishing stage and an ID edge polishing stage. Different colored spacers may be used during the two polishing stages, with green spacers used during ID edge polishing and orange spacers used during OD edge polishing. The green spacers may have slightly different inner and outer diameters than the orange spacers to facilitate polishing either the ID or OD of the substrate. Different colors are used to enable easy identification and tracking of the laminate so that it can be sent to the appropriate polishing machine. For example, sensors may be used to automatically detect the color of the spacers of a particular stack so that it can be routed to the correct edge polishing machine. Following completion of an ID edge polishing stage, the substrates need to be separated from the green spacers of the stack so that the substrates can then be stacked together in a new laminate separated by the orange spacers for OD edge polishing. Following completion of the OD edge polishing stage, the substrates need to be separated from the orange spacers so that the substrates can then be further processed, such as by performing one or more surface polishing stages. In other examples, the order of the ID and OD edge polishing stages may be reversed.

Figure 4:
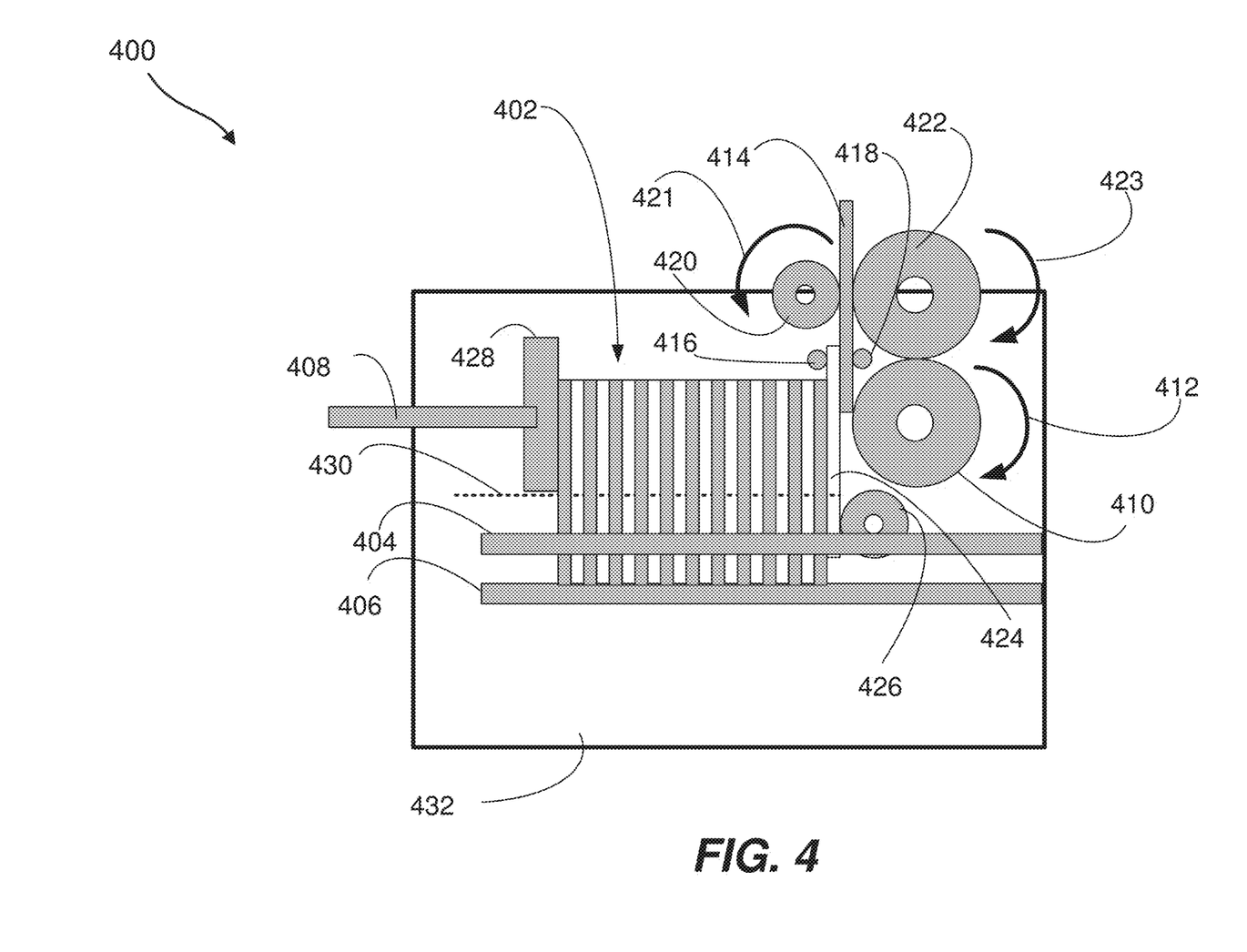
FIG. 4 illustrates features of an automatic substrate/spacer laminate separation apparatus, in accordance with aspects of the disclosure.

FIG. 4 illustrates components of an automatic laminate separation (or delamination) apparatus 400 configured to automatically separate substrates and spacers of a substrate/spacer stack or laminate 402. Apparatus 400 includes a set of substrate guide bars, 404 and 406, (or guider) for holding the laminate 402 horizontally. A pusher bar 408 is configured to press against one end of the laminate 402 so that the outermost substrate or spacer at the other end of the laminate 402 is pressed against a primary roller or brush 410 that rotates in the direction of arrow 412 to cause the spacer or substrate at the end of laminate to be peeled off and conveyed vertically upward away from the stack. In the particular example of FIG. 4, the outermost component of the laminate 402 is a spacer 414. As shown, roller 410 causes the spacer 414 to pass through a pair of horizontal Teflon™ bars 416 and 418 (or guider) and then between a second roller or brush 420 and at third roller or brush 422 which pull the spacer 414 farther away from the laminate. Bars 416 and 418 help prevent folding of spacers during use.

In use, brush 420 rotates in the direction of arrow 421 and brush 422 rotates in the direction of arrow 423. As also shown in FIG. 4, the action of the rollers may also cause the substrate 424 that is directly adjacent to spacer 414 to be displaced vertically as well so that substrate 424 may then be peeled away from the remainder of laminate 402. In addition to the rotating rollers or brushes, a fixed brush 426 is provided to help guide or facilitate the peeling operation by, for example, helping to secure a bottom end of the laminate 402.

FIG. 4 also illustrates that the pusher bar 408 (or modular sponge pusher) has a sponge member 428 for pressing against the laminate 402. The pusher bar 408 is offset vertically from a central longitudinal axis 430 of the laminate 402. The higher position helps to create more pressure along the top of the laminate to provide a more secure grip point on the top of disks for the rollers. It has been found that more reliable operation of the apparatus is achieved when using an offset pusher bar rather than an aligned pusher bar, especially when separating out the last or second to the last of the substrates/spacers. If the pusher bar is instead aligned with the axis 430 of the laminate 402, the spacers/substrates can become bent or folded as they are peeled from the end of laminate, which in turn can prevent the top end of the spacer from being properly secured by a pick and place robot arm (not shown in FIG. 4, but discussed below). Note also that the various components of the apparatus may be installed within a housing 432, which may be filled with a suitable liquid bath (not shown) to facilitate the removal of the substrates and the spacers by lubricating and loosening them from adjacent spacers/substrates. A suitable liquid is distilled water.

Figure 5:
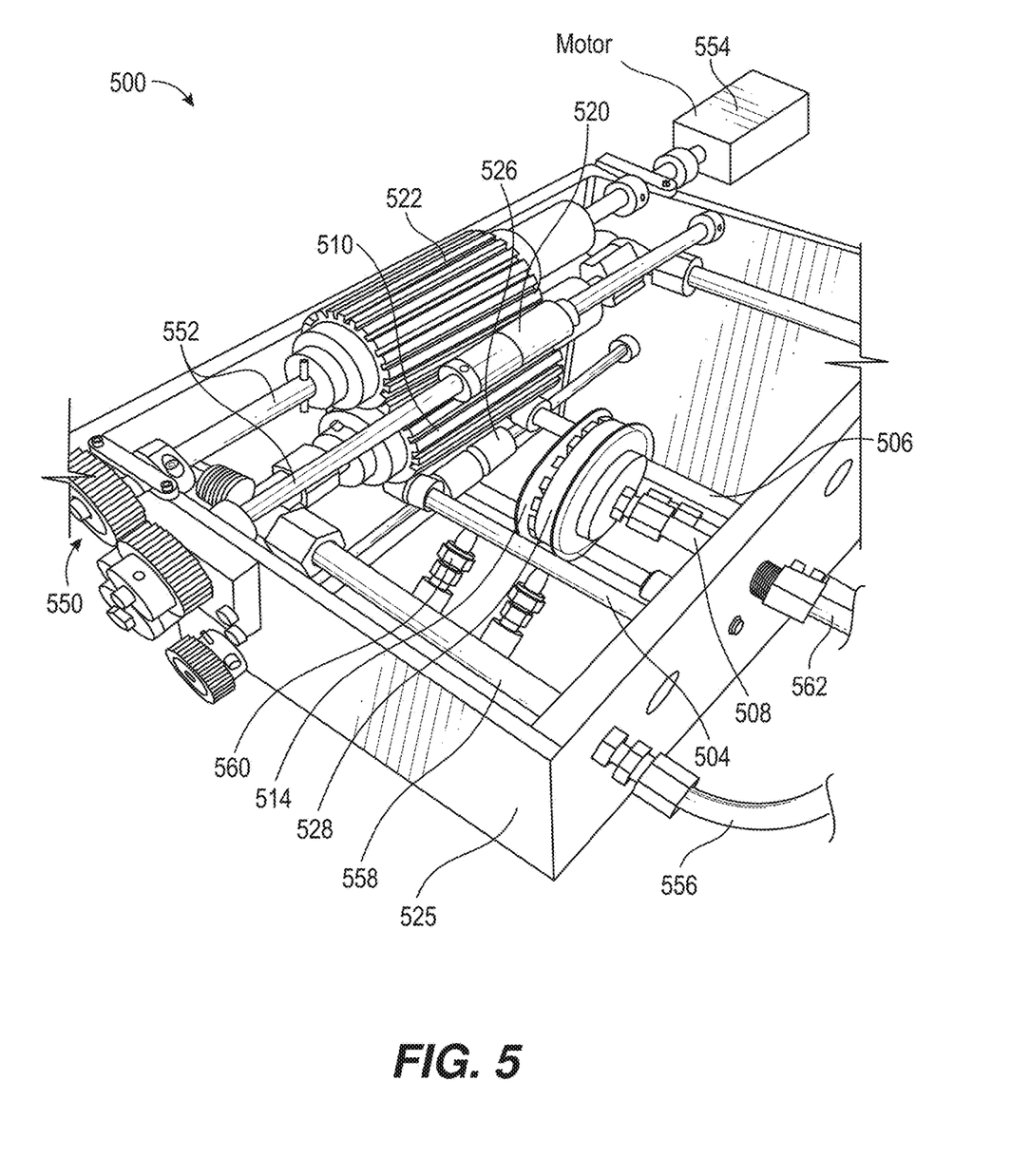
FIG. 5 illustrates a perspective view of a portion of an automatic substrate/spacer laminate separation apparatus configured in accordance with aspects of the disclosure.

FIG. 5 illustrates a perspective view of a delamination apparatus 500 including a pusher bar 508 with a sponge 528, guide bars 504 and 506, rotating brush or roller 510 and additional rollers 520 and 522. Also shown is a static brush (or pair of static brushes) 526. The figure illustrates various gear mechanisms 550 and connection bars 552 for rotating the various rollers and also illustrates a gear-type stepping motor 554 (in phantom lines) for automatically rotating the rollers. (In other examples, a manual crank may instead be provided where the motor 554 is shown.) The motor 554 causes the various rollers 510, 520, and 522 to rotate as described above to peel away substrates and spacers from a substrate/spacer laminate. Note that in FIG. 5 only a single spacer 514 is shown, rather than an entire laminate of disks/spacers. The single spacer 514 has not yet been pressed against the roller 510 by the pusher bar 508.

FIG. 5 also illustrates a housing or bath 525. The housing 525 is shown empty, whereas in use the housing 532 is filled with liquid, as described above. Note that in other example, rollers 520 and 522 may each consist of two separate roller portions offset horizontally from one another. This helps reduce the risk that spacers become bent or folded. The separation of the rollers into two separate roller portions also provides more space so that a pick and place robot arm can more easily take hold of the spacers/substrates. The separation can also help reduce friction among the brushes during operation. FIG. 5 also illustrates a tube 556 that provides air to an air cylinder 558, which includes nozzles 560 for blowing air against the laminate. Alternatively, the nozzles 560 may be used to spray disinfected water against the laminate. In still other examples, the nozzles are omitted. Although not shown in FIG. 5, the pusher bar 508 may be connected to a pneumatic line for controlling the pusher bar 508. Still further note that FIG. 5 does not illustrate bars corresponding to bars 416 and 418 of FIG. 4.

Figure 6:
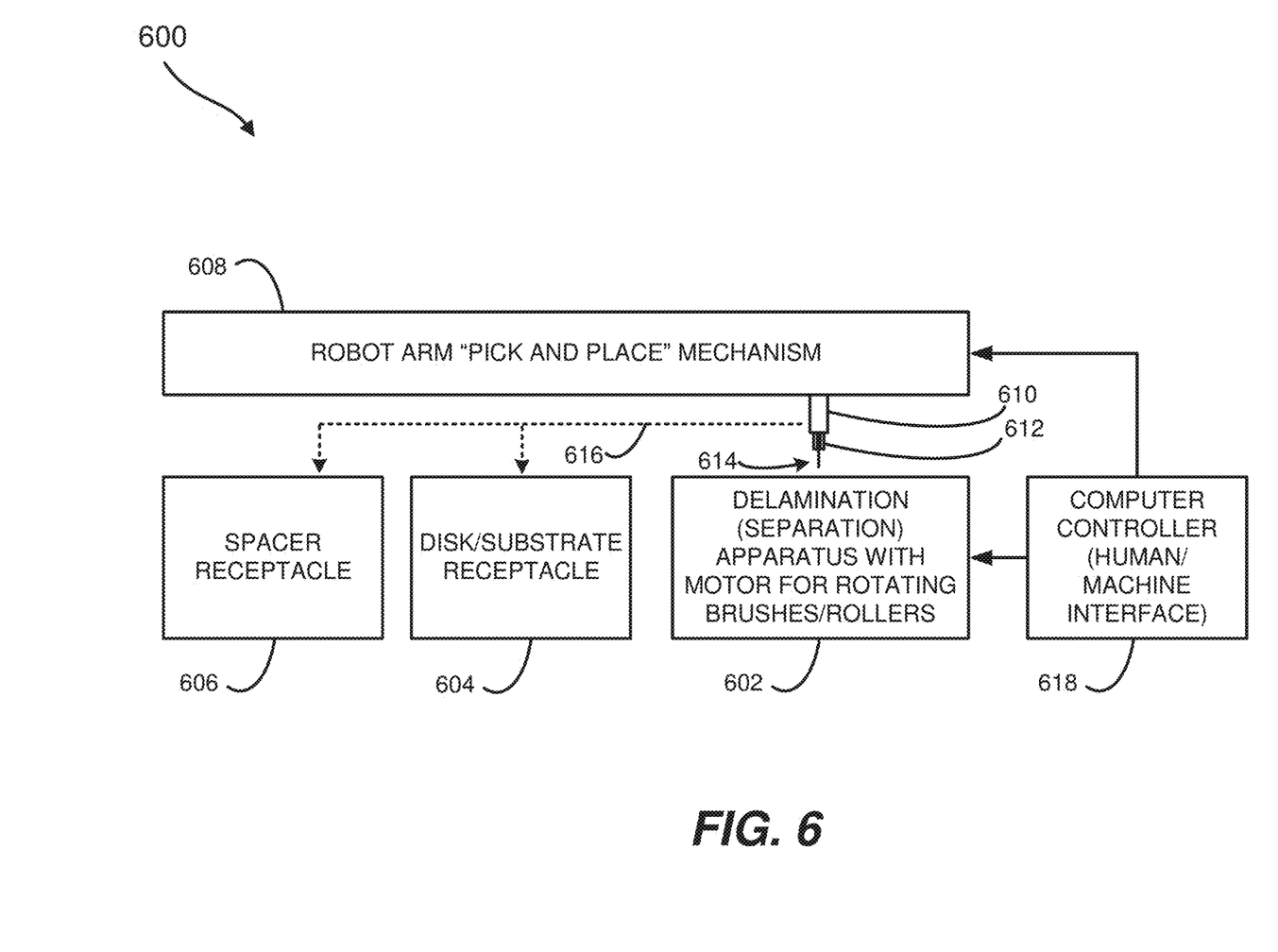
FIG. 6 is a block diagram of components of an automatic substrate/spacer laminate separation (delamination) apparatus including a computer control system, a "robot pick and place" arm, and other features, configured in accordance with aspects of the disclosure.

FIG. 6 is a block diagram illustrating an overall delamination system 600, which includes a delamination apparatus 602, which may be, for example, the apparatus of FIG. 4 or 5 provided with a motor for rotating the rollers/brushes. Delamination system 600 also includes a disk/substrate receptacle 604 for storing the disk substrates after they have been separated from a spacer/substrate laminate (not shown in FIG. 6) and a spacer receptacle 606 for holding the spacers after they have been separated from the spacer/disc laminate. A robot arm "pick and place" system 608 includes a robot arm 610 with a pincher mechanism 612 for holding a spacer or substrate, such as exemplary substrate 614. As shown by dashed line 616, the robot arm 610 may move from the delamination apparatus 602 to the disk receptacle 604 or the spacer receptacle 606 to deposit a spacer or disk in the correct receptacle. The system 600 is controlled by a computer controller 618, which controls both the operation of the delamination apparatus 602 to, for example, control the rotation of the rollers and the movement of the pusher bar described above and also to control the operation of the robot arm pick and place mechanism 608. The controller may include a human—machine interface (HMI).

Although not shown in FIG. 6, the overall system may also include a pre-soak station that includes one or more spurgers. A laminate may be placed into the pre-soak station. An ID spurger may spray water against the ID of the substrates of the laminate to clean away Cerium or other particles left over from the ID polishing stage. (Cerium is used as a polishing powder.) An OD spurger may spray water against the OD of the substrates of the laminate to clean away Cerium or other particles left over from the OD polishing stage. The pre-soak station may have a water recirculation system for recirculating the water used by the spurgers. The spurgers may be configured for horizontal oscillation to facilitate cleaning the laminate. The laminate is then manually placed into the delamination apparatus 602.

The delamination apparatus 602 may also be called a separation station or separation apparatus.

Figure 7:
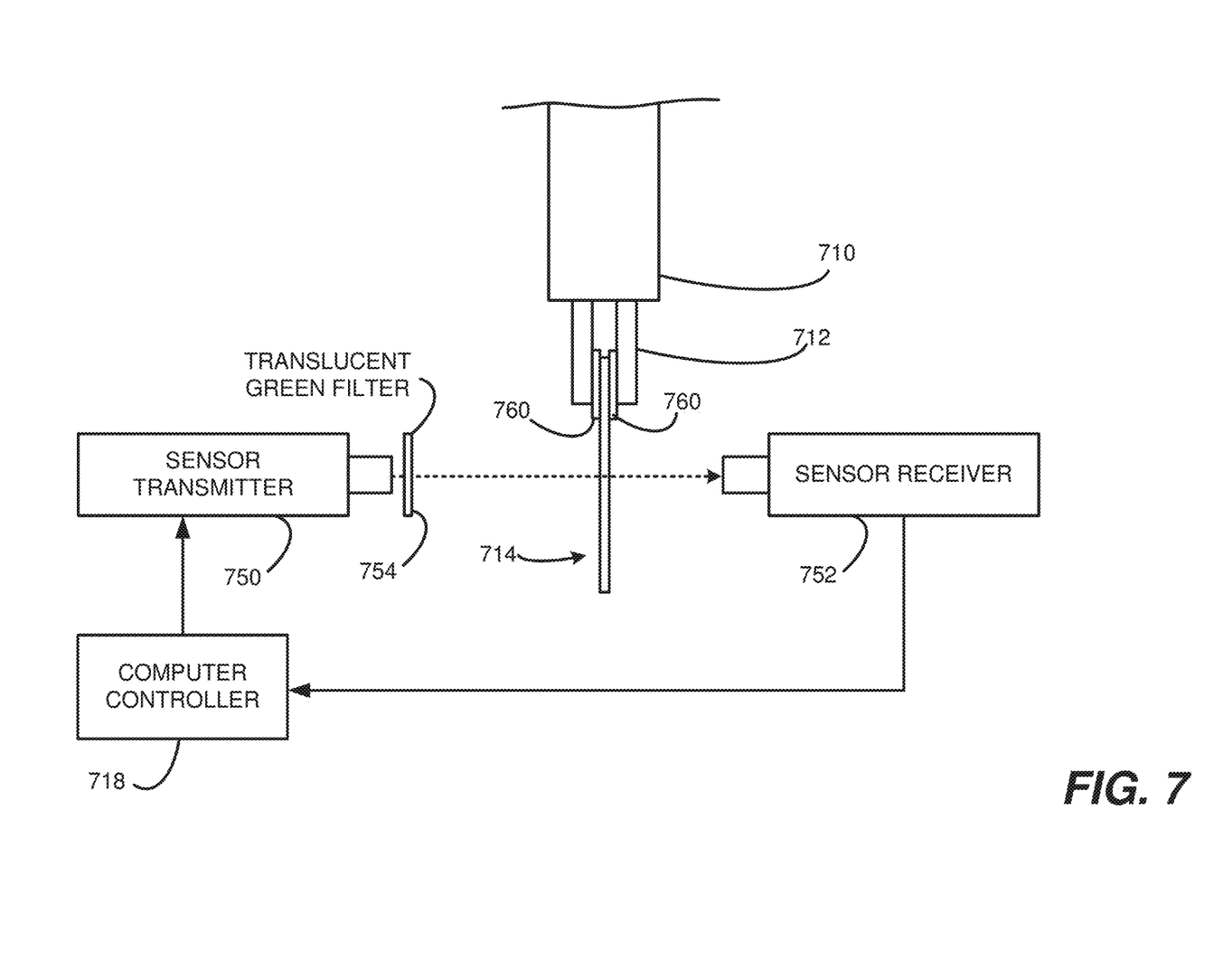
FIG. 7 is a block diagram of sensor and robot arm components of an automatic substrate/spacer laminate separation apparatus, configured in accordance with aspects of the disclosure.

FIG. 7 is a block diagram illustrating a portion of a robot "pick and place" arm at 710 and its pincher mechanism 712 holding an exemplary disc 714. In order to enable the computer controller 718 of the overall delamination system to detect whether the robot arm is holding a transparent disk or a translucent colored spacer, the system includes a thru-beam sensor apparatus, including a sensor transmitter 750 and a sensor receiver 752. A translucent green filter 754 may be placed along the optical path between the sensor transmitter 750 and the sensor receiver 752 to facilitate the detection of both green spacers and orange spacers. In this regard, it has been found that without such a translucent filter, the system might be able to detect only a particular color of spacer, such as a green spacer, but not a different colored spacer, e.g., an orange spacer. If the sensors do not detect a spacer or substrate, the rollers or the delamination apparatus may be automatically stopped, then reversed, then started again in an effort to successfully peel the next spacer/substrate from the laminate. Note also that the pincher mechanism 712 may include pads 760 formed of EPDM to help reduce the risk of scratches on the substrate disks as the disks are transported from the delamination apparatus to the disk receptacle (as shown in FIG. 6). In other examples, an ultrasonic sensor might be used, though it might not be as effective as a thru beam sensor.

Figure 8:
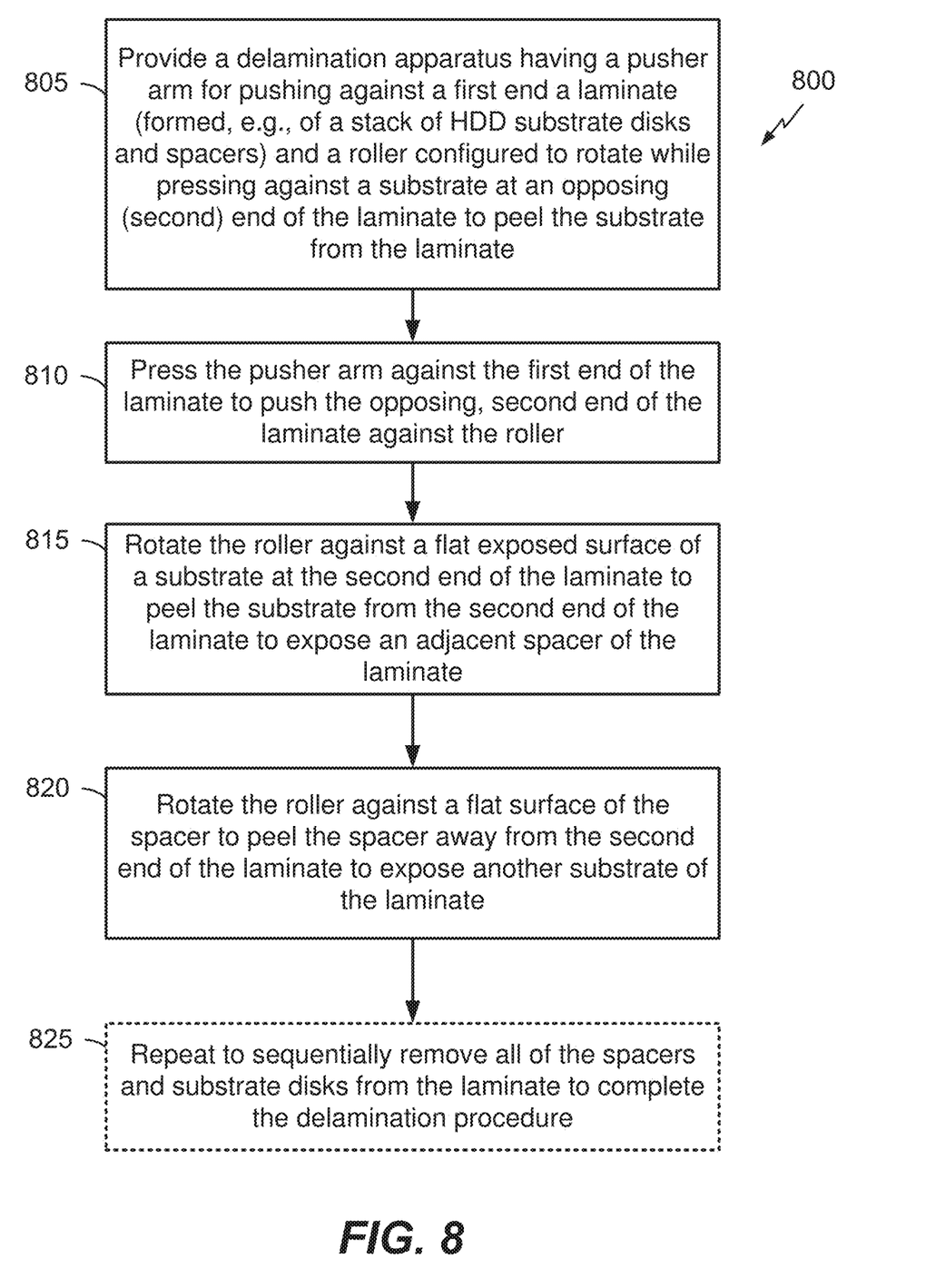
FIG. 8 illustrates an exemplary flow diagram of a method for separating substrates and spacers from a substrate/spacer laminate, in accordance with an aspect of the disclosure.

FIG. 8 illustrates an exemplary flow diagram of a method 800 for a delamination procedure for separating substrates from spacers in a laminate, such as the laminate described above in connection with FIGS. 1A-B. It should be noted that the sequence of FIG. 8 may combine one or more processes to simplify and/or clarify the method for delamination. In some implementations, the order of the processes may be changed or modified. The glass disk substrates may be subjected to an initial ID or OD edge polishing procedure (not shown in FIG. 8) during which the substrates and spacers are stacked together in the laminate, with the procedure of FIG. 8 then operating to separate the substrates from the spacers. The thickness of the glass substrate may be equal to or less than 4 mm, equal to or less than about 3 mm, equal to or less than about 2 mm, equal to or less than about 1.5 mm, equal to or less than about 1 mm, equal to or less than about 0.7 mm, equal to or less than about 0.5 mm, or equal to or less than about 0.3 mm. For example, in some embodiments, the thickness may be equal to or less than about 0.1 mm, such as in a range from about 0.05 mm to about 0.1 mm. In some examples, the substrates each has an outer diameter (i.e., OD) of about 97 mm. In other examples, the OD may be 95 mm or 95.1 mm. (Generally speaking, such disks are all referred to as "3.5 inch" disks.) The spacer may be, for example, equal to or less than 0.5 mm, equal to or less than about 0.4 mm, equal to or less than about 0.1 mm thick.

At block 805, a delamination apparatus is provided that has a pusher arm for pushing against a first end a laminate (formed of a stack of HDD substrate disks and spacers) and a roller configured to rotate while pressing against a substrate at an opposing (second) end of the laminate to peel the substrate from the laminate. The OD and ID of the spacers may be about the same as the OD and ID of the substrates. The delamination apparatus may be configured as shown in FIGS. 4-7 and described above.

At block 810, the pusher arm is pressed against the first end of the laminate to push the opposing, second end of the laminate against the roller.

At block 815, the roller is rotated against a flat exposed surface of a substrate at the second end of the laminate to peel the substrate from the second end of the laminate to expose an adjacent spacer of the laminate.

At block 820, the roller is rotated against a flat surface of the spacer to peel the spacer away from the second end of the laminate to expose another substrate of the laminate.

At block 825, the operations are (optionally) repeated to sequentially remove all of the spacers and substrate disks from the laminate to complete the delamination procedure to fully separate all of the disk substrates from the spacers. As explained above, the robot arm pick and place mechanism may be used to place each substrate and each spacer is separate trays for subsequent processing or, in the case of the spacers, for re-use as spacers.

In some examples, the following overall procedures may be employed:
1. Pre-soak a stack of substrates (with spacers in between) in a submerge tank of the separation apparatus to help to release the substrate/spacer tension.
2. Manually load the stack onto substrate guider.
3. Press "Start" on HMI screen of the system controller to cause the sponge pusher to start moving forward (via a pneumatic air cylinder) to push the stack of substrates against to the brushed/rollers to "clamp" the stack against the brush/rollers.
4. Once clamping is achieved, the air-pressure in the air cylinder of the sponge pusher may self-adjust via air-pressure (via a pneumatic valve control) to maintain a suitable amount of pressure pushing the stack against the brush/rollers.
5. The motor then starts turning to cause the rollers/brushes to peel off a substrate/spacer from the end of the laminate.
6. When the sensor detects the spacer/substrate that has been peeled away, the brush/rollers stop turning so that the robot arm can take the spacer/substrate and place it in the appropriate receptable.
7. Once the sensor detects that the spacer/substrate has been taken away by the robot arm, the motor resumes turning the brushes/rollers to peel off the next spacer/substrate.
8. Stages 6 and 7 are repeated until all spacers/substrates of the laminate have been removed or a "Stop" button on the HMI screen is pressed. Then, the motor stops and sponge pusher retract to a standby position.

An advantage of using the various methods and apparatus described herein is that scratching of the substrates is reduced or avoided, which might otherwise occur. The automatic system allows for a higher part per hour (PPH) than a manual system.

Figure 9:
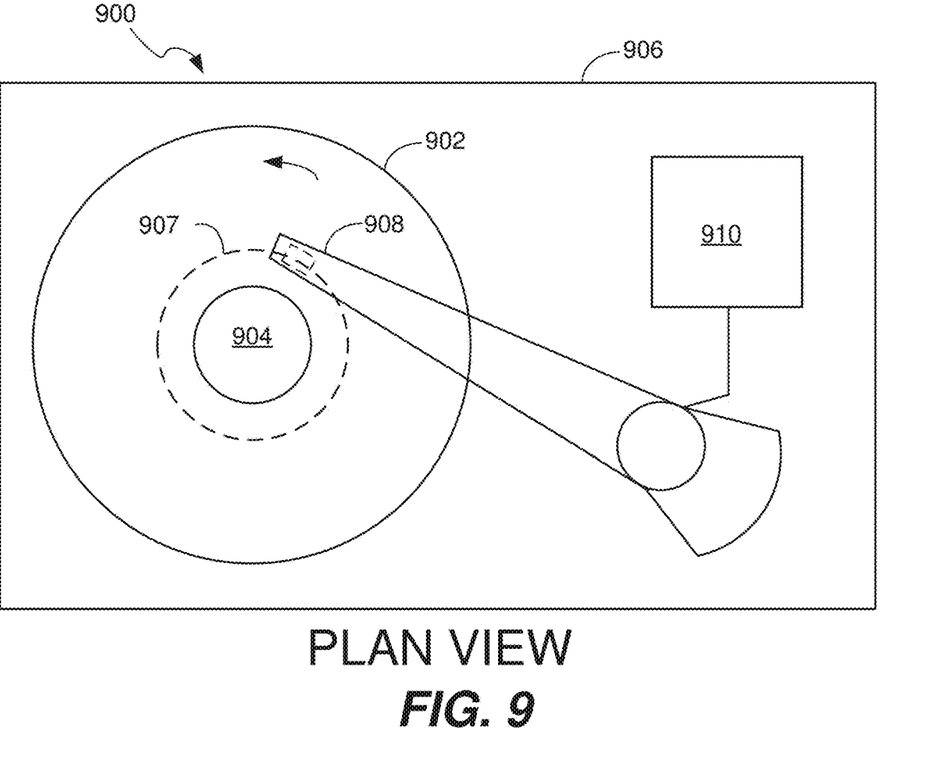
FIG. 9 illustrates a top plan view of a disk drive in accordance with an aspect of the disclosure.

FIG. 9 illustrates a plan view of a disk drive 900 (e.g., hard disk drive) configured for using disks with glass substrates. The disk drive 900 may be a type of a magnetic storage device. The disk drive 900 includes one or more magnetic media 902 (e.g., disk), a spindle assembly 904, a drive housing 906, a slider 908 and a position control circuitry 910. The slider 908 may include a slider head. The position control circuitry 910 may be used to position the slider head over a preselected track (e.g., track 907) on the media 902. The one or more media 902 may be configured to store data. The media 902 may be a magnetic recording medium. The media 902 may be a media disk. The media 902 may be a means for storing data.

As described herein, the media 902 may include glass substrates having substrates separated from a substrate/spacer laminate as described above (and then subsequently processed to form various magnetic recording layers and other layers thereon for use the media 902). The media 902 is positioned on the spindle assembly 904 that is mounted to the drive housing 906. Data may be stored along tracks (e.g., track 907) in the magnetic recording layer of the media 902. The reading and writing of data are accomplished with a read element and a write element located within the slider 908. The write element is used to alter the properties of the magnetic recording layer of the media 902 and thereby write information thereto. In an implementation, the slider 908 may include an inductive read/write head or a Hall effect head.

During an operation of the disk drive 900, a spindle motor (not shown) rotates the spindle assembly 904, and thereby rotates the media 902. The slider 908 may be positioned over the media 902 at a particular location along a preselected disk track 907. The positions of the slider 908, relative to the media 902 may be controlled by a position control circuitry 910. As the media 902 is rotating, the slider 908 may glide over the media 902.

Figure 10:
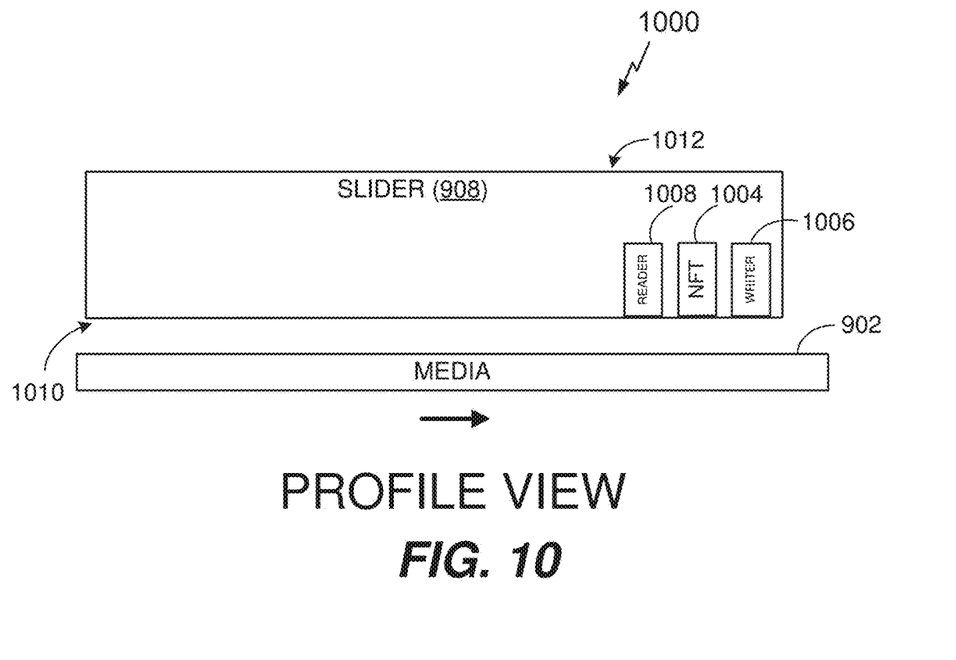
FIG. 10 illustrates a profile view of a slider and a disk in accordance with one aspect of the disclosure.

FIG. 10 illustrates a profile view of the slider 908 and the media 902 of FIG. 9. In particular, FIG. 10 illustrates an assembly 1000 that includes the slider 908, a near-field transducer (NFT) 1004 (if the head is a heat assisted magnetic recording (HAMR) head), a writer 1006 and a reader 1008. The NFT 1004 may be omitted in a non-HAMR head, and other components may be used instead in other types of energy assisted recording technology (e.g., a spin torque oscillator (STO) in a microwave assisted magnetic recording (MAMR) head). The assembly 1000 is positioned over the media 902. The slider 908 may be one component or several components. The slider 908 may include a slider and a slider head. In some implementations, a slider head may be a separate component that may be integrated with the slider 908. The NFT 1004, the writer 1006 and the reader 1008 may be implemented in the slider, the slider head or combinations thereof. If the slider 908 is configured for HAMR, it may also include a laser, which may be mounted on the slider directly or using a sub-mount, which provides light energy to the NFT to heat a portion of the media 902 in conjunction with writing information. The slider 908 includes a first surface 1010 (e.g., bottom surface) that faces the media 902. The first surface 1010 may be referred to as an air bearing surface (ABS). The slider 908 also includes a second surface 1012 (e.g., top surface) that faces away from the media 902. The NFT 1004, the writer 1006 and the reader 1008 may be located near or along the first surface 1010 of the slider 908. The writer 1006 may be a writing element (e.g., means for writing data) for writing data on the media 902, and the reader 1008 may be a reading element (e.g., means for reading data) for reading data on the media 902. The writer 1006 may include a writing pole/writer pole.

The specification describes various embodiments for automatically or semi-automatically separating the spacers and substrates of a laminate. It shall be appreciated by those skilled in the art in view of the present disclosure that although various exemplary methods are discussed herein with reference to glass substrates for magnetic recording disks, the methods, with or without some modifications, may be used with glass substrates for other types of recording disks, for example, optical recording disks such as a compact disc (CD) and a digital-versatile-disk (DVD), or magneto-optical recording disks, or ferroelectric data storage devices. In addition, the methods, with or without some modifications, may be used for glass substrates for other applications. For example, the glass substrate may also be used in other applications, such as, for the touch screen of electronic devices such as lap-top computers, mobile phones and the like; for the cover plate glass of photoelectric (device) plates; or for the deposit substrate or the protective cover plate of film solar cells. Although described primarily with respect to glass substrates, at least some aspects may be applicable to other types of substrates.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X." with the meaning noted above.

As used herein, the term "determining" encompasses a wide variety of actions. For example, "determining" may include calculating, computing, processing, deriving, investigating, looking up (e.g., looking up in a table, a database, datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. An apparatus for separating components of a laminate of disk-shaped substrates interleaved with disk-shaped spacers, the apparatus comprising:
 a pusher bar configured to push against a first end of the laminate to push a second end of the laminate against a roller;

wherein the roller is configured to rotate while pressing against a flat surface of a substrate at the second end of the laminate to remove the substrate from the second end of the laminate to expose a spacer of the laminate and to then rotate while pressing against a flat surface of the spacer to remove the spacer from the laminate to expose another substrate of the laminate; and a controller configured to control the roller and the pusher bar to sequentially remove the substrate, the spacer, and additional substrates and spacers from the laminate.

2. The apparatus of claim 1, wherein the laminate has a central longitudinal axis and wherein the pusher bar is further configured to push against the first end of the laminate at a position offset from the central longitudinal axis.

3. The apparatus of claim 2, further comprising a substrate guide bar and wherein the pusher bar is offset vertically from the substrate guide bar.

4. The apparatus of claim 1, wherein the roller is a first roller and wherein the apparatus further comprises a second roller and a third roller positioned and configured to sequentially receive a first substrate and a first spacer that are removed from the laminate.

5. The apparatus of claim 1, further comprising a robot picker arm configured to transport a first substrate that has been removed from the laminate to a substrate-retaining tray and to then transport a first spacer that has been removed from the laminate to a spacer-retaining tray.

6. The apparatus of claim 5, wherein the robot picker arm comprises an ethylene propylene diene monomer (EPDM) material on a pincher mechanism.

7. The apparatus of claim 5, wherein the controller is further configured to control the operation of the robot picker arm.

8. The apparatus of claim 5, further comprising a sensor configured to sense whether the robot picker arm is holding a substrate or a spacer.

9. The apparatus of claim 8, wherein the substrates are transparent and the spacers are translucent and the sensor is configured to distinguish between the spacers and the substrates using these characteristics.

10. The apparatus of claim 1, further comprising a bath and wherein the laminate, the roller, and the pusher bar are submerged in the bath.

11. The apparatus of claim 10, wherein the laminate is submerged horizontally in the bath and the roller and the pusher bar are positioned to convey the substrate and the spacer upward and out of the bath.

12. An apparatus comprising:
a bath configured to submerge a laminate of disk-shaped substrates interleaved with disk-shaped spacers;
a pusher bar configured to push against a first end of the laminate to push a second end of the laminate against a roller;
wherein the roller is configured to rotate while pressing against a flat surface of a substrate at the second end of the laminate to remove the substrate from the second end of the laminate to expose a spacer of the laminate and to then rotate while pressing against a flat surface of the spacer to remove the spacer from the laminate to expose another substrate of the laminate; and
a controller configured to control the roller and the pusher bar to sequentially remove the substrate, the spacer, and additional substrates and spacers from the laminate.

13. The apparatus of claim 12, wherein the submerged laminate has a central longitudinal axis and wherein the pusher bar is further configured to push against the first end of the submerged laminate at a position offset from the central longitudinal axis.

14. The apparatus of claim 13, further comprising a substrate guide bar and wherein the pusher bar is offset vertically from the substrate guide bar.

15. The apparatus of claim 12, wherein the roller is a first roller and wherein the apparatus further comprises a second roller and a third roller positioned and configured to sequentially receive a first substrate and a first spacer removed from the submerged laminate and to convey the first substrate and the first spacer farther away from the second end of the laminate and out of the bath.

16. The apparatus of claim 12, further comprising a robot picker arm configured to transport a first substrate that has been removed from the submerged laminate to a substrate-retaining tray and to then transport a first spacer that has been removed from the submerged laminate to a spacer-retaining tray.

17. The apparatus of claim 16, further comprising a sensor configured to sense whether the robot picker arm is holding a substrate or a spacer.

18. A method for separating components of a laminate of disk-shaped substrates and disk-shaped spacers, the method comprising:
pressing a pusher arm against a first end of the laminate to push a second end of the laminate against a roller;
rotating the roller against a flat surface of a substrate at the second end of the laminate to remove the substrate from the second end of the laminate to expose a spacer of the laminate; and
rotating the roller against a flat surface of the spacer to remove the spacer away the second end of the laminate to expose another substrate of the laminate.

19. The method of claim 18, wherein the laminate has a central longitudinal axis, and wherein pressing the pusher arm against the first end of the laminate to push the second end of the laminate against the roller comprises pushing against the first end of the laminate at a position offset from the central longitudinal axis.

20. The method of claim 18, further comprising transporting a first substrate that has been removed from the laminate to a substrate-retaining tray and then transporting a first spacer that has been removed from the laminate to a spacer-retaining tray.

* * * * *